July 19, 1949.     G. A. WAHLSTRÖM     2,476,784
TUMBLER SWITCH
Filed Nov. 12, 1946

Inventor
G. A. Wåhlström

Patented July 19, 1949

2,476,784

UNITED STATES PATENT OFFICE 2,476,784

TUMBLER SWITCH

Gustaf Adolf Wåhlström, Fagerviksvagen, Sweden, assignor to Telefonaktiebolaget L. M. Ericsson, Stockholm, Sweden, a company of Sweden Application November 12, 1946, Serial No. 709,387
In Sweden November 21, 1945

1 Claim. (Cl. 200—68)

The present invention relates to a tumbler switch with a lever handle which, when moving, actuates a wiper arm operated by spring pressure. The object of the invention is to produce a tumbler switch with great electrical breaking capacity, small dimensions and simple construction. According to the invention, this is achieved. A cradle is rockably mounted in the bottom of the switch by means of knife edges and has in its upper part a pivot pin on which the wiper arm is mounted, and having on its upper edge recesses into which the lower part of the lever handle is received. By displacement, the lever handle causes the cradle to rock and the wiper arm is caused to open and close the contacts in a way known per se.

Figure 1:
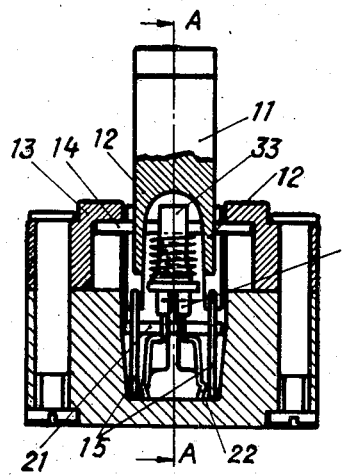
Figure 2:
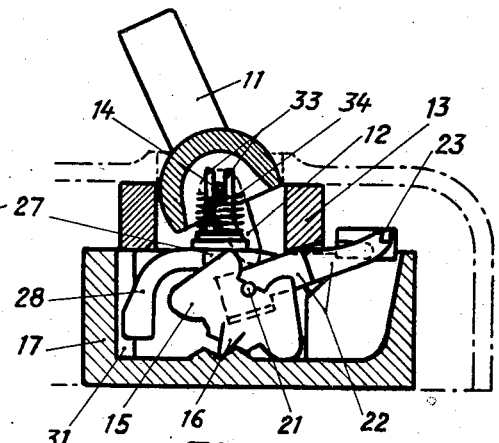
Figure 3:
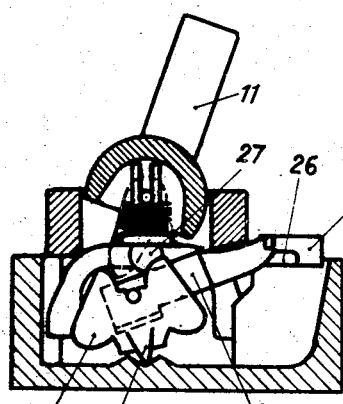
Figure 4:
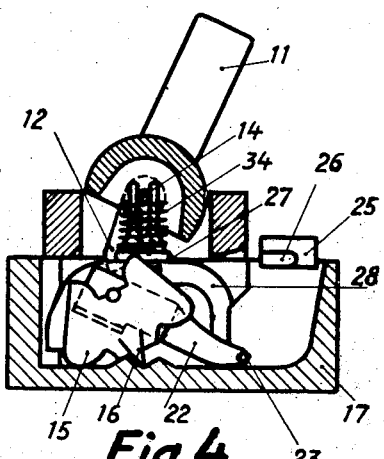
Figure 5:
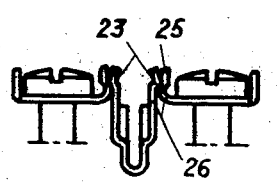

The invention will be described more closely with reference to the accompanying drawing. Fig. 1 is a cross-section of the switch taken perpendicularly to the direction of movement of the lever handle. Figs. 2-4 are sections in the direction of movement of the lever handle and show the switch in different positions, Fig. 4 showing the same position as Fig. 1. Fig. 5 is a detail, showing a front view of the wiper arm and the fixed contacts in the position shown in Fig. 2.

The lever handle 11, Figs. 1-4, has at its lower part two shanks 12, which are mounted on a pintle 14 fixed in the frame 13 of the switch. Said shanks 12 co-operate with two parts of a cradle 15, which by means of knife edges 16, is rockably mounted in the porcelain base 17 forming the bottom of the switch. The cradle 15 is so mounted that the shanks 12 of the lever handle, which extend into recesses in the upper part of the cradle, by displacement rock the cradle. Close below said recesses there is mounted in the cradle 15 a pivot pin 21, on which a bifurcated wiper arm 22 is mounted. Said arm 22 is provided at its ends with contact points 23, which co-operate with fixed relatively spaced contact plates, each having a plane end portion 25 and a breaking portion 26 formed as a protuberance.

The wiper arm 22 is actuated by two rollers 27 mounted on a pivot pin fixed in a frame 28, which slides in grooves 31 in the base 17. The frame 28 supports a bifurcated post 33 loosely embracing the pintle 14 and around which there is a coil spring 34, which is confined between said pintle 14 and a flange on the frame 28. Consequently, the rollers 27 are pressed by the spring 34 against the wiper arm 22.

Figs. 2 and 5 show the wiper arm 22 in position to close contacts 23, 25, and the cradle 15 rocked to the right. The rollers 27 then press on the left end of the arm 22. If the lever handle 11 is now moved from the position shown in Fig. 2 to the position shown in Fig. 3, the cradle 15 will be rocked to the left. Thereby, the arm 22 is moved to the breaking position 23, 26 shown in Fig. 3. The rollers 27, by reason of the movement of the arm 22, are now on the right side of the pivot pin 21, the arm 22 therefore having a downward torque at the contact point. This causes the contact suddenly to break and the different parts in the switch to take the position shown in Figs. 4 and 1. Said break is effected very rapidly and surely. On the lever handle 11 being moved from the position shown in Fig. 4 to the position shown in Fig. 2, the rollers 27 will be positioned, by reason of the movement of the arm 22, on the left side of the pivot pin 21, the wiper arm 22 then taking the position shown in Fig. 2.

The construction described above, in which the cradle is pivoted in the bottom of the switch, allows the switch to be made low, which is especially advantageous for assembling and also contributes to a pleasing appearance.

I claim:

In an electric switch, the combination of a casing having a pair of side walls and a bottom provided with a groove having plane sides angularly disposed; a cradle comprising a pair of relatively spaced plates and a pivot pin connecting said plates, each of said plates having on its lower edge a depending foot having a knife edge received in the bottom of said groove, to support said cradle rockably on said bottom, and on its upper edge a recess providing relatively spaced shoulders; a pintle mounted in said walls parallel with the bottom of said groove, said pintle and said bottom being in the same vertical plane; a manually actuated lever pivoted on said pintle and having an upper portion projecting outwardly of said casing and a pair of depending fingers projecting into said recesses, respectively, and co-acting with said shoulders to rock said cradle; a bifurcated contact lever rockably pivoted on said pin; a pair of contact plates so mounted on said walls, respectively, that said contact lever is brought into and out of contact with said plates when rocked; a frame slidably mounted in said casing; a pair of rollers depending from said frame above the sides of said contact lever, respectively; a bifurcated post on said frame loosely embracing said pintle; and a coil spring confined between said pintle and said frame and biasing said rollers against said contact lever to rock said lever when said cradle is rocked.

GUSTAF ADOLF WÅHLSTRÖM.

REFERENCES CITED

The following references are of record in the file of this patent:

UNITED STATES PATENTS

| Number | Name | Date |
|---|---|---|
| 1,777,330 | Seuffert | Oct. 7, 1930 |
| 2,377,134 | Dietrich | May 29, 1945 |
| 2,384,985 | Young | Sept. 18, 1945 |
| 2,405,697 | Wahlstrom | Aug. 13, 1946 |

FOREIGN PATENTS

| Number | Country | Date |
|---|---|---|
| 5,462 | Great Britain | Mar. 5, 1912 |